United States Patent [19]

Martin

[11] Patent Number: 4,622,442
[45] Date of Patent: * Nov. 11, 1986

[54] ELECTRONIC HYBRID HAVING SYNTHESIZED IMPEDANCE CIRCUITRY

[75] Inventor: Philip T. Martin, Raleigh, N.C.

[73] Assignee: ITT Corporation, New York, N.Y.

[*] Notice: The portion of the term of this patent subsequent to Jan. 28, 2003 has been disclaimed.

[21] Appl. No.: 630,801

[22] Filed: Jul. 13, 1984

Related U.S. Application Data

[63] Continuation-in-part of Ser. No. 564,637, Dec. 22, 1983, Pat. No. 4,567,331.

[51] Int. Cl.[4] .............................................. H04B 1/58
[52] U.S. Cl. ................................... 379/402; 379/345; 379/348
[58] Field of Search ........ 179/170 NC, 170 R, 170 T, 179/77, 16 F, 16 AA

[56] References Cited
U.S. PATENT DOCUMENTS 4,388,500 6/1983 Regan .......................... 179/170 NC Primary Examiner—James L. Dwyer
Attorney, Agent, or Firm—John T. O'Halloran; Jeffrey P. Morris

[57] ABSTRACT

An electronic hybrid circuit for coupling a two-wire communication path to a four-wire communication path includes amplifier circuits having a reactive feedback path such that the output impedance of each amplifier is approximately zero ohms at DC and is a predetermined value at audio frequencies. The amplifiers are arranged to provide battery and voice signal injection on the two-wire path. Serially connected diodes provide protection from lightning.

2 Claims, 2 Drawing Figures

ELECTRONIC HYBRID HAVING SYNTHESIZED IMPEDANCE CIRCUITRY

This application is a continuation-in-part of original application, Ser. No. 564,637 filed Dec. 22, 1983 now U.S. Pat. No. 4,567,331.

BACKGROUND OF THE INVENTION

This invention pertains generally to apparatus for effecting two-to-four wire conversion in communication systems. More particularly, the invention is directed to a subscriber line interface circuit (SLIC) providing electronic hybrid circuitry for interconnecting a two-wire subscriber loop to a four-wire transmission medium while simultaneously providing DC battery feed to the subscriber loop.

One typical prior SLIC is taught in U.S. Pat. No. 4,041,252 issued to Earl T. Cowden and assigned to the assignee of the present invention. That SLIC and variations of it have been widely and successfully utilized in the System 1210 electronic switching system manufactured and sold by International Telephone and Telegraph Corporation.

The Cowden SLIC includes provisions for battery boost, or range extension, applications such that the total DC battery potential injected into the line is increased. A combined battery and voice injection circuit is coupled to either side of the subscriber line by a resistance. For a line requiring a 900 ohm AC termination impedance, a 450 ohm resistor is connected to each side of the line.

A further consideration in the use of interface circuitry relates to the possible presence of lightning in the outside-plant circuitry. More specifically, lightning may strike tip and ring wires strung on poles with a resultant voltage surge traveling to the central office. While large voltage surges are limited by protection equipment at the central office, there is the possibility that a smaller voltage surge may travel beyond the protection circuitry and damage the sensitive electronics of the interface circuit. It thus becomes desirable to incorporate some form of protection into the design of the interface circuit, which protection would not interfere with normal operation of the interface circuit.

SUMMARY OF THE INVENTION

In accordance with the principles of the invention, an improved SLIC circuit includes power amplifier in the battery boost circuit which have a synthesized output impedance thereby permitting the use of lower valued battery feed resistors while still providing a predetermined AC impedance across a subscriber line. Further, in accordance with the invention, the synthesized impedance varies with frequency from effectively zero ohms at DC to a predetermined value in a desired frequency range.

Advantageously, the use of lower valued battery feed resistors combined with approximately zero DC output impedance of the power amplifiers results in a significant reduction in the DC power required by the line feed for a given line current. Additionally, the lower power consumption allows higher circuit packing density. Both advantages result in lower per line circuit costs.

In accordance with a further feature of the invention, lightning protection is provided at the output terminal of each of the power amplifiers. The protection circuit comprises a set of serially connected diodes having a central node connected between a feed resistor and the output terminal of the power amplifier.

BRIEF DESCRIPTION OF THE DRAWINGS

The invention may be better understood from a reading of the following detailed description in conjunction with the drawings in which.

DETAILED DESCRIPTION

Figure 1:
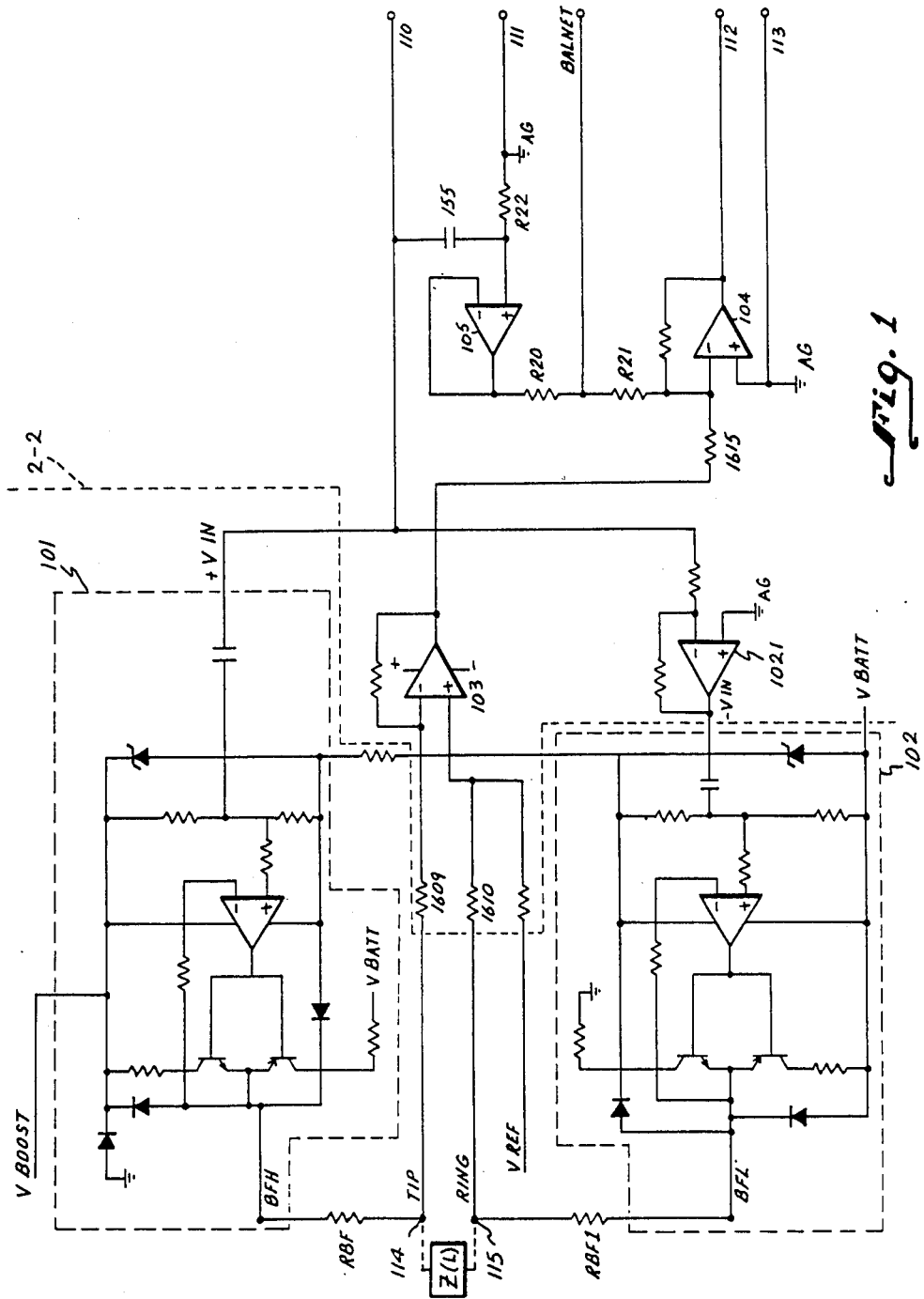
FIG. 1 illustrates a SLIC circuit to which the present invention may be advantageously applied.

The SLIC circuit of FIG. 1 is coupled to the two-wire communication path at terminals 114 and 115. The dashed lines terminated by box Z (L) represent that looking out toward the two-wire subscriber path, one "sees" an AC impedance of Z (L).

The four-wire communication path is coupled to the SLIC at four-wire path input terminals 110 and 111 and at four-wire output path terminals 112 and 113. Unbalanced four wire input signals are coupled from terminal 110 to the input +VIN of amplifier 101 and are also coupled to the input of an inverting amplifier 1021. The output of inverting amplifier 1021 is coupled to the input −VIN of amplifier 102.

The output BFH of amplifier 101 is coupled via battery feed resistor RBF to one side of the two wire communication path. The output BFL of amplifier 102 is coupled via battery feed resistor RBF1 to the other side of the two-wire communication path.

The two wire communication path also has one side coupled via resistor 1609 to the inverting input of amplifier 103 and its other side coupled via resistor 1610 to the non-inverting input of amplifier 103. The output of amplifier 103 is coupled via resistor 1615 to the inverting input of output buffer amplifier 104. The non-inverting input of amplifier 104 is coupled to ground. The output of amplifier 104 is coupled to the output portion of the four-wire path at terminal 112.

The unbalanced four-wire input signals at terminal 110 are also coupled via a capacitor 155 to the non-inverting input of a buffer amplifier 105. A resistor R22 is coupled from capacitor 155 to audio ground. The output of amplifier 105 is coupled via resistors R20 and R21 to the inverting input of output buffer amplifier 104. A transhybrid balance network BALNET comprising well-known circuitry is coupled to the node between resistors R20 and R21. The capacitor 155, resistor R22, and amplifier 105 serve to balance the low frequency phase shift between the balance network and that which occurs in the amplifiers 101 and 102.

The unbalanced four-wire path incoming voice signal at terminal 110 is amplified and converted to a pair of balanced signal components by inverting amplifier 1021, and by the amplifiers 101 and 102 coupled to opposite sides of the two-wire path. The amplifiers 101 and 102 inject both AC voice signals and DC battery potential onto the two-wire path via the battery feed resistors RBF and RBF1.

Balanced two-wire path signals received at terminals 114 and 115 are converted for transmission to the outgoing portion of the four-wire path by coupling the two-wire path signals to the series combination of differential amplifier 103 and output buffer amplifier 104. The amplifier 105 and transhybrid balance network BALNET prevent the coupling of signals from the incoming portion of the four-wire path to the outgoing portion of the four-wire path.

In the aforementioned Cowden patent, a similar structure to that shown in FIG. 1 is described. The Cowden amplifier circuits comparable to amplifiers 101 and 102 are unitary-gain feedback amplifiers with an output impedance of effectively zero ohms from DC to beyond the upper end of the audio frequency band of interest. These amplifiers utilize resistive feedback and do not utilize reaction feedback. For an AC impedance of 900 ohms looking into terminals 114 and 115 from the subscriber line, the two battery feed resistors RBF and RBF1 must each have a value of 450 ohms.

Figure 2:
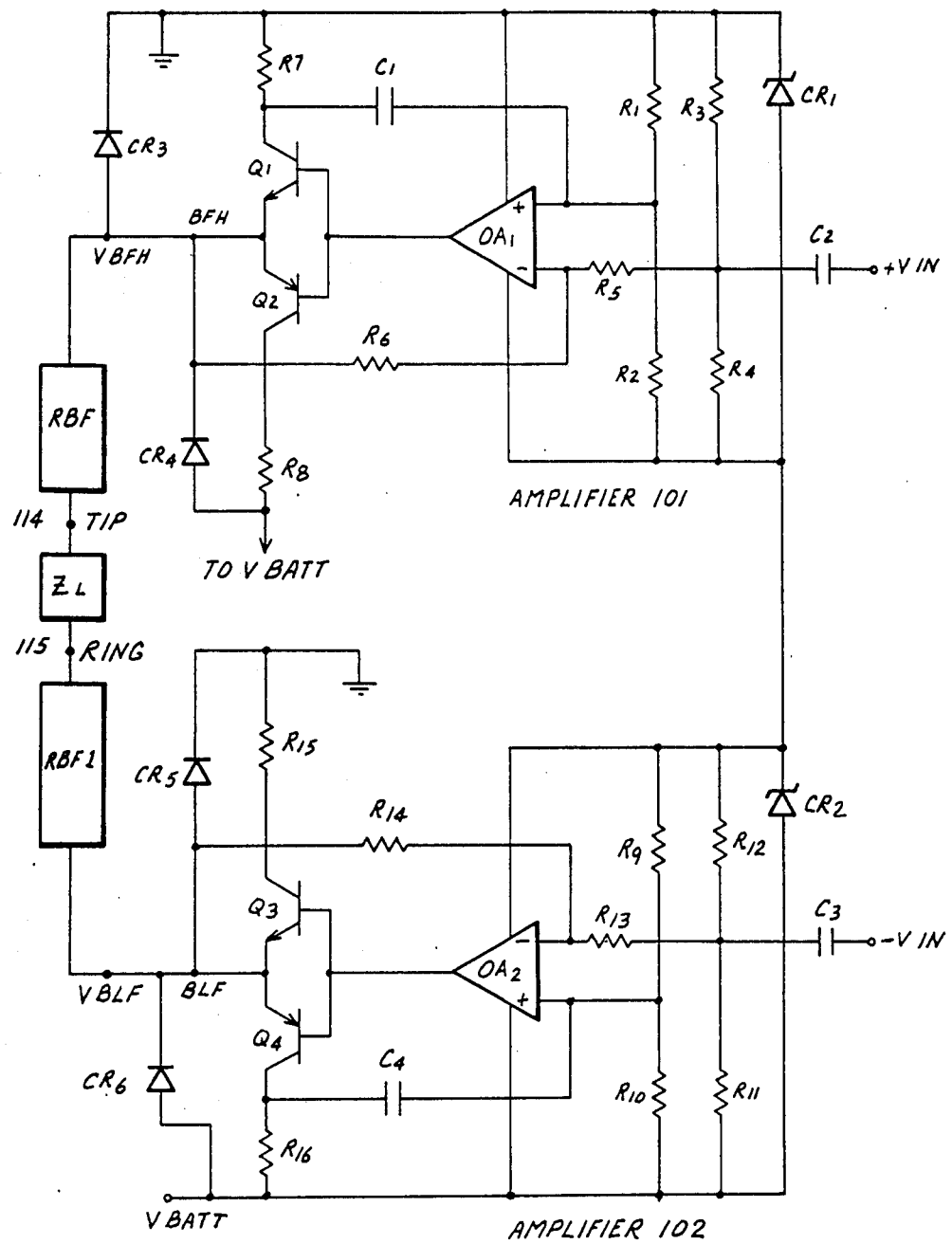
FIG. 2 illustrates in greater detail a portion of the circuit of FIG. 1 as modified by the present invention.

Turning now to FIG. 2, that portion of the circuit of FIG. 1 to the left of dotted line 2—2, as modified by the present invention, is shown in greater detail. The amplifiers 101 and 102 are identical in structure and, accordingly, in the interest of clarity and brevity only the structure of amplifier 101 will be described in detail.

Zener diodes CR1 and CR2 set the power supply voltage for the amplifiers 101,102. Resistors R1,R2, R3, R4, R9, R10, R11, and R12 are biasing resistors for amplifiers OA1 and OA2. Transistors Q1 through Q4 provide the necessary power handling capability and are connected in a well known manner.

The input signal at the terminal +VIN is applied to the junction of resistors R3, R4, R5, and capacitor C2. Because the value of capacitor C2 is selected sufficiently large, its impedance is negligible at the frequencies of interest. The input signal is coupled to the inverting input of operational amplifier OA1 by resistor R5. The inverting input of OA1 is also connected to the output BFH via a feedback resistor R6. Thus, assuming that the non-inverting input of amplifier OA1 is held at a constant potential, the resistors R5, R6 and amplifier OA1 form an inverting feedback amplifier with a gain equal to R6/R5. Actually, the non-inverting input of amplifier OA1 is not held constant because of a second feedback signal that appears at this input. However, as is explained hereinbelow, this does not change the gain.

The second feedback signal is generated at the collector of transistor Q1 and is coupled to the non-inverting input of amplifier OA1 by capacitor C1. This is a form of current feedback because the feedback signal is generated by the current flowing in resistor R7 via transistor Q1 and is equal to the product of the current flowing through R7 multiplied to the value of resistor R7. The effect of this feedback can be determined by assuming the signal at terminal +VIN is zero and then noting that as the current flowing through Q1 and out of terminal BFH increases, the voltage at the collector of transistor Q1 goes negative. In turn, this voltage is coupled to the non-inverting input of amplifier OA1 forcing the voltage at that point negative. The signal at the non-inverting input is then amplified. Because the signal amplified is at the non-inverting input of amplifier OA1, the gain is (R5+R6)/R5. This amplified signal causes the amplifier output at BFH to go negative giving the net effect of a synthesized impedance, i.e., the output voltage decreases at the output current increases.

An analysis of the circuit shows that the relationship between the output voltage and the input voltage is:

$$\frac{VBFH}{VIN} = \frac{-R6}{R5} \times \tag{1}$$

-continued
$$\frac{(ZL/2) + RBF}{(ZL/2) + RBF + \frac{R7 \times (R5 + R6) \times R1//R2}{R5 \times (R1//R2 + XC1)}}$$

where
(2) $R1//R2 = (R1 \times R2)/(R1+R2) = R$;
(3) $XC1 = 1/sC1$ (where s is the complex operator jw); and
(4) $ZL/2$ = The effective impedance from terminal 114 to ground contributed by the line impedance ZL when VBFL is equal to $-$VBFH.

Inspection of equation (1) shows that the amplifier circuit OA1 behaves as an amplifier with a gain equal to R6/R5 and an output impedance Z0 defined by the following equation.

$$ZO = R7 \times \frac{(R6 + R5)}{R5} \times \frac{R1//R2}{R1//R2 + XC1} \tag{5}$$

Equation (5) can be rearranged to give:

$$ZO = R7 \times K \times \frac{sT}{sT + 1} \tag{6}$$

where $$K = \frac{R6 + R5}{R5}, \tag{7}$$

which is the gain of the non-inverting input of amplifier OA1 to terminal BFH, and $$T = \frac{R1 \times R2 \times C1}{R1 + R2} \tag{8}$$

Thus, the voltage at terminal VBFH may be written as $$VBFH = -Vin \times \frac{R6}{R5} \times \frac{(ZL/2 + RBF)}{(ZL/2 + RBF) + ZO} \tag{9}$$

Inspection of equation (6) shows that at low frequencies Z0 is effectively zero ohms. At higher frequencies, when sT becomes large compared to 1, Z0 equals R7×K ohms. Thus at low frequencies $$VBFH = -VIN \times \frac{R6}{R5} ; \text{and} \tag{10}$$

at high frequencies $$VBFH = -VIN \times \frac{R6}{R5} \times \frac{(ZL/2 + RBF)}{(ZL/2 + RBF) + (R7 \times K)} \tag{11}$$

By reason of symmetry, it can be shown that for amplifier 102 the terminal BFL has similar and complementary gain and impedance characteristics.

Thus, the total output impedance of both terminals BFH and BFL viewed in series is twice Z0. Similarly, the impedance between terminals 114 and 115 is RBF+RBF1+(2×Z0).

The impedance between terminal 114 and ground looking into the SLIC is RBF+Z0. Choosing R7 to be 50 ohms and the quotient of R6/R5 equal to four, the mid-frequency value of Z0 is 250 ohms.

For a desired impedance between terminals 114 and 115 of 900 ohms, the impedance between each of the terminals 114, 115 and ground is 450 ohms. The battery feed resistors RBF and RBF1 are thus each 200 ohms.

It can be seen from the equations above that by varying R7, the gain R6/R5, and T that various other DC and AC impedances can be obtained. Thus, the desirable characteristics of a low DC impedance and a synthesized AC impedance are provided by the invention.

In accordance with a further feature of the invention, lightning protection is provided by the connection of the diodes CR3 and CR4 in the amplifier 101, and the diodes CR5 and CR6 in the amplifier 102. Diodes CR3 and CR5 are connected between the output terminals BFH and BFL and ground in the amplifiers 101 and 102 respectively. Diodes CR4 and CR6 are connected between battery voltage and the output terminals BFH and BFL in the amplifiers 101 and 102, respectively. The operation of the lightning protection in each of the amplifiers 101 and 102 is the same and, accordingly, only the operation of the lightning protection in the amplifier 101 will be described in detail in the interest of clarity and brevity.

In the series connection of the diodes CR3 and CR4, the cathode terminal of diodes CR3 is connected to ground the the anode terminal of diode CR4 is connected to battery voltage, this connection back-biasing the diodes CR3 and CR4 because the battery voltage is negative with respect to ground.

The advantage of the protection circuit derives from the fact that the feedback signal of capacitor C1 is attained by connection to the collector terminal of transistor Q1 rather than by connection to the tip wire (terminal 114) where lightning induced voltage appears. Induced lightning voltages can be as large as 1000 volts with respect to ground, and may be of either positive or negative polarity.

When a large voltage (from lightning) appears at the tip wire, the protection diodes CR3 and CR4 become activated. If the tip voltage goes sufficiently positive with respect to ground with a corresponding increase of current through transistor Q2, as limited by collector resistor R8, then the output voltage VBFH is urged positive and diode CR3 clamps the output voltage to ground potential. Essentially, all of the voltage surge appears as a voltage drop across the feed resistor, an advantage which is attained by the connection of feedback components and protection diodes to the inboard side of the feed resistor, rather than at the tip wire (terminal 114) itself. Similarly, if the tip voltage is driven sufficiently negative with respect to ground, diode CR4 clamps the output voltage to the potential of the negative terminal of the battery. Thereby, the output voltage and the voltage applied to components within the amplifier 101 are limited to the range between the potential of ground and battery voltage, nominally zero and minus 48 volts respectively.

The lightning voltage is confined to the tip wire by current flow in the feed resistor RBF and the corresponding one of the protection diodes which is in a state of conduction. In such case, the voltage drop across the feed resistor, given by the product of the feed resistance times the current in the feed resistor, equals the difference of the lightning voltage minus the output voltage VBFH. The ratings of the circuit components fall within the foregoing voltage range so as to attain the lightning protection, the protection also being attained by the foregoing decoupling of the lightning voltage from the output terminal by the feed resistor RBF.

It is also noted that in the absence of the protection diodes, the lightning potential at the tip wire could appear at the output terminal and at other points within the amplifier 101 connecting with the output terminal. This occurs because the impedance of the amplifier components is relatively high compared to the resistance of the feed resistor. Thus little attenuation of the tip voltage would occur between the tip wire and the amplifier components prior to component breakdown.

Accordingly, it is appreciated that the foregoing connection of the protection diodes in combination with the feed resistor protects the amplifier components from lightning and other sources of large surge voltages on the tip wire. Similar protection is provided for surge voltages appearing on the ring wire due to the similarity of operation of the amplifier 102.

It is to be understood that the above described embodiment of the invention is illustrative only and that modifications thereof may occur to those skilled in the art. Accordingly, the invention is not to be regarded as limited to the embodiment disclosed herein, but is to be limited only as defined by the appended claims.

What is claimed is:

1. A circuit for coupling a two-wire transmission path to a four-wire transmission path, said coupling circuit comprising:

a first amplifier having inputs coupled to said two-wire transmission path and an output coupled to one side of said four-wire transmission path;

first and second circuits each priviiding combined battery and voice signal injection to said two-wire path whereby AC voice signals are combined with DC battery potential, each having an input terminal coupled to the other side of said four-wire transmission path and each having an output terminal;

a first battery feed impedance coupled between said first circuit output terminal and one side of said two-wire path;

a second battery feed impedance coupled between said second circuit output terminal and the other side of said two-wire path;

a first protection circuit and a second protection circuit, each of said protection circuits comprising a set of serially connected diodes having a central node at the interconnection of two of said diodes, said diodes being poled for reverse bias upon connection between ground and battery potential, said first and said second circuits each being connected between ground and a battery potential, said first protection circuit being connected between the ground and the battery potential of said first circuit with central node connected to the junction of said first battery feed impedance and said first circuit output terminal, and said second protection circuit being connected between the ground and the battery potential of said second circuit and with central node connected to the junction of said second battery feed impedance and said second circuit output terminal;

each of said first and second circuits comprising a differential input amplifier having first and second inputs and an output, a first resistor coupled between said input terminal and said first input, a first feedback impedance coupled between said output terminal and said first input;

circuit means coupling said output to said output terminal, a second resistor having one end coupled to a voltage source terminal and its other end coupled to said output terminal via said circuit means, a second feedback impedance coupled between said second resistor other end and said second input, whereby said first and second circuit means each operate to provide an output impedance at the respective said output terminal which is approximately zero for DC and is a predetermined non-zero value at voice frequencies.

2. A circuit for coupling a two-wire transmission path to a four-wire transmission path said circuit comprising:

first circuit means for receiving signals from said two wire path and for transmitting corresponding signals over one side of said four-wire path, and second circuit means for receiving signals from the other side of said four-wire path and for applying corresponding signals to said two-wire path and for providing DC battery potential to said two-wire path, said second circuit means comprising:

a first battery feed impedance coupled to one lead of said two-wire path;

a second battery feed impedance coupled to the other lead of said two-wire path;

a first amplifier circuit having a first input coupled to said other side of said four-wire path and an output terminal coupled to said first battery feed impedance, said first amplifier circuit having a reactive feedback path such that said first amplifier circuit has a DC impedance of approximately zero ohms and a predetermined non-zero impedance value at audio frequencies;

a secomd amplifier circuit having a first input coupled to said other side of said four-wire path and an output terminal coupled to said second battery feed impedance; and a first protection circuit and a second protection circuit, each of said protection circuits comprising a set of serially connected diodes having a central node at the interconnection of two of said diodes, said diodes being poled for reverse bias upon connection between ground and battery potential, said first and said second circuit means each being connected between ground and a battery potential, said first protection circuit being connected between the ground and the battery potential of said first circuit means with central node connected to the junction of said first battery feed impedance and said first circuit means output terminal, and said second protection circuit being connected between the ground and the battery potential of said second circuit means and with central node connected to the junction of said second battery feed impedance and said second circuit means output terminal.

* * * * *